Patented Feb. 8, 1949

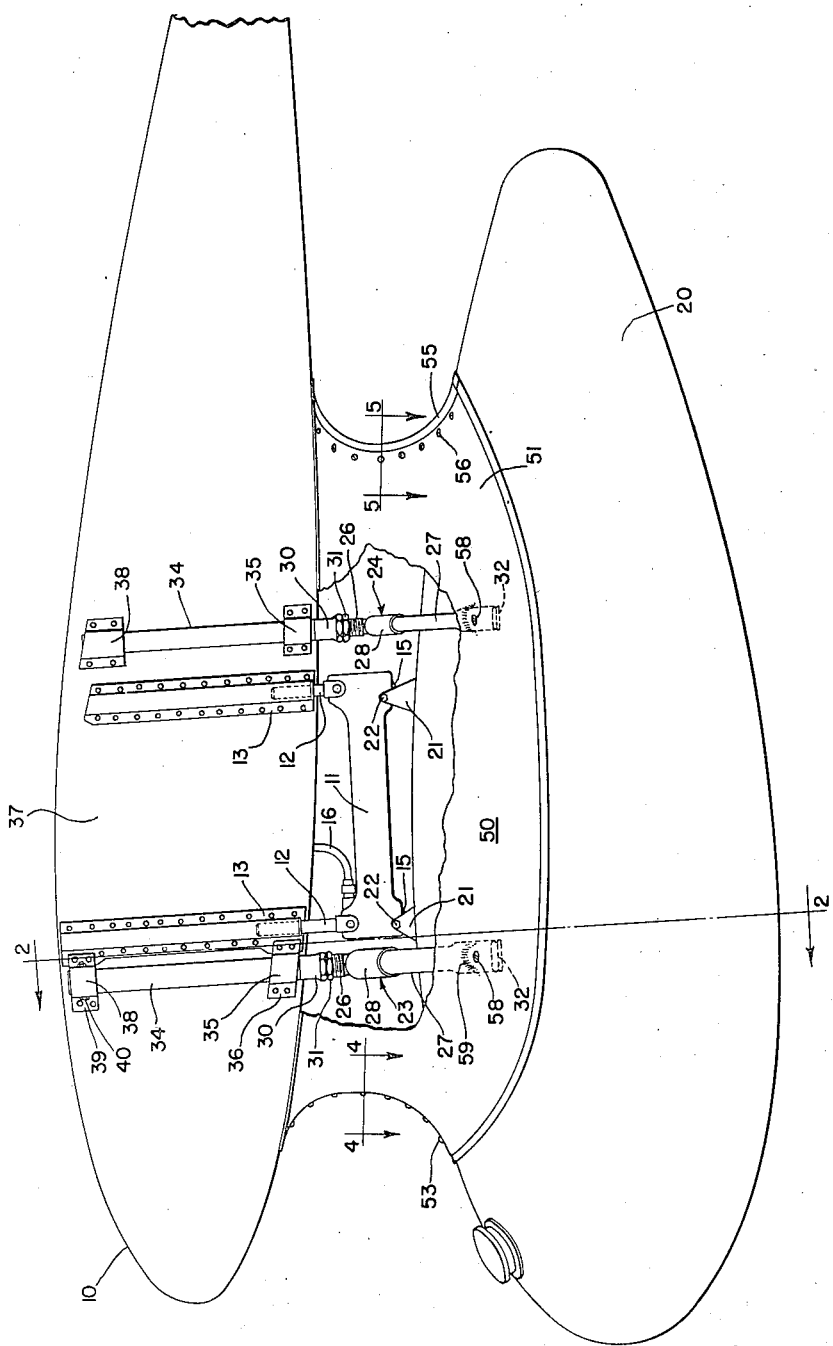

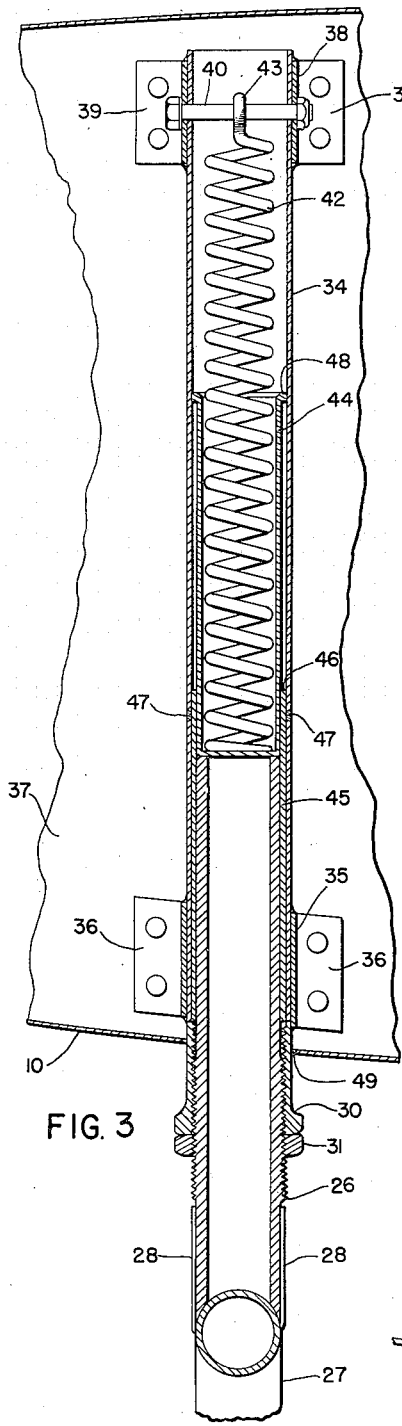

2,461,406

UNITED STATES PATENT OFFICE 2,461,406

SWAY BRACE INSTALLATION

Paul M. Birk, Kenmore, and Frederick I. Steele, Snyder, N. Y., assignors to Curtiss-Wright Corporation, a corporation of Delaware Application July 6, 1945, Serial No. 603,464

5 Claims. (Cl. 89—1.5)

1

The present invention relates to article mounting means particularly adapted for aircraft use in connection with externally mounted releasable articles as bombs, auxiliary fuel tanks and the like.

A primary object is to provide article mounting means for aircraft in which certain parts of the mounting means may be released from the aircraft at the time of releasing the article or object itself, thereby effecting a considerable reduction in drag loads and improvement of performance and speed.

Another object is to provide an improved and useful article sway brace assembly which may be adjusted easily to accommodate the configuration of the article to be braced.

Still a further object is found in the compact arrangement of the article mounting assembly such that the same may be enclosed and faired into the aircraft, thus improving its appearance as well as the effect on the flight characteristics of the aircraft.

Other objects and advantages will be pointed out in the following detailed description of a preferred arrangement clearly shown in the drawing, in which:

Figure 1 is an assembly view of the article mounting arrangement as it appears when carried on an aircraft wing structure, the view being taken in elevation with portions of a fairing means broken away, Figure 2 is a partial sectional elevational view of the invention as seen at line 2—2 in Figure 1, Figure 3 is a greatly enlarged and fragmentary sectional view of a typical sway brace installation, the view being taken along line 3—3 in Figure 2, Figure 4 is a fragmentary sectional plan view of the leading edge means for assembling the fairing structure as seen at line 4—4 in Figure 1, and Figure 5 is a further fragmentary sectional plan view of the trailing edge assembly means for the fairing as taken along line 5—5 of Figure 1.

The invention is disclosed in connection with a wing mounted article or the like, in which an airfoil structure 10 is generally indicated as being provided with a more or less conventional bomb rack structure 11 fixedly secured by elements 12 to the under surface of the airfoil, as by bracket plates 13. The rack 11 has a forward releasable catch means 15 and a similar rearward catch means 16, each adapted for simultaneous release by means of an operating cable, hydraulic means or the like, the latter being indicated generally

2 at 18. The bomb rack and associated parts are only briefly shown since they do not constitute a part of the present invention, except as they may become useful in combination with other parts now to be described in detail.

In the present disclosure a fuel tank 20 is suspended from the rack 11 by means of suitable bracket structures 21 in which a cross rod or pin 22 is secured for engagement in the respective catch means 15 of the rack. However, due to the nature of these pins 22, the tank 20 will have a certain degree of freedom of movement or sway in a lateral direction as well as vertically.

To prevent tank sway or movement, there are provided fore and aft sway braces, shown respectively at 23 and 24. Each such sway brace (Figures 1 and 2) is substantially similar in construction but the rearward one is dimensionally smaller due to the configuration of the tank and the distribution of its mass. In the preferred form each brace comprises a central body member or stem 26, a curved, tubular yoke member 27, the extremities of which provide contact points at widely spaced locations transversely of the length of the article or in this case the tank 20, and strengthening plates 28 on each side of the connection of the stem with the base or mid point of the yoke. The stem may be welded to the yoke and the plates 28 welded to both the stem and the yoke as may be desired. Further, the lower end of the stem is threaded and an adjusting sleeve 30 and lock nut 31 threaded thereon for a purpose later appearing.

Each extremity of the yoke 27 is flattened (Figure 2) and a rubber pad or similar means 32 is secured thereto to protect the tank from damage as is well understood. Moreover, the rearward brace 24 may also have a similar pad (not shown) at the yoke base whereas the forward brace 23 does not necessarily have a pad so located as, in the case of a fuel tank, such pad would interfere with the desired location of a fuel transfer line extending from the tank into the wing structure.

Referring to Figures 1 and 2 generally and to Figure 3 in particular there is shown a preferred means for mounting each of the sway braces on the wing. The disclosure of the latter figure may be considered as typical of both braces and hence a detailed description for the forward brace will be sufficient. In the drawing, the stem 26 is slidably mounted in a substantially vertically directed tubular guide 34, the latter being fixed at its lower end by a welded on ring bracket structure 35 having ears 36 attached by rivets or bolts directly to a wing rib 37. The upper end of the guide is secured in a similar ring bracket 38 and the latter riveted or bolted by its ears 39 to the rib 37. In addition, a diametrically positioned bolt 40 is provided at the upper end of the guide in order to act as a support for a resilient element or spring 42, as by engagement in the anchor loop 43 thereof. The lower end of this resilient element 42 is seated in a tubular piston member 44 such that the latter is urged toward the lower open end of the guide 34. It will be observed that the piston has a sliding fit within a sleeve element 45 which is secured in the lower portion of the guide 34 to extend from the open end of the guide upwardly a predetermined distance where its upper end forms a shoulder 46. The sleeve 45 is preferably secured to the guide at its upper end by a series of rosewelds 47 effected through a number of circumferentially spaced apertures in the wall of the guide 34.

The upper end of the piston member 44 is provided with a flange formation 48 which slides on the guide wall and is adapted to contact the shoulder 46 in the outward movement thereof under spring pressure. In the preferred arrangement the length of the piston member from the flange 48 to its closed lower end is so chosen as to bring its closed end substantially flush with the skin surface of the airfoil 10 thereby plugging the otherwise open end of the guide 34 and substantially filling the skin aperture 49 provided in the airfoil.

The purpose of the above described assembly is to provide a substantially rigid mounting socket or guide for receiving the stem or central body member 26 of the sway brace and to provide a simple but positive means for forcing the brace against the article being carried as well as for jettisoning the brace simultaneously with the tank 20 or other article mounted on the rack 11. Therefore, the stem 26 of the sway brace is slidably received in the sleeve 45 of the guide assembly and bears against the end of the piston member 44 by which it is continually urged in an outward direction as above noted. The depth of penetration of the stem 26 inwardly of the guide is adjustably determined by the threaded sleeve 30 whose upper end bears against the lower end of the guide 34. The lock nut 31 secures the sleeve in adjusted relation.

In use each of the sway braces is thrust upwardly into its guide and the tank 20 or other article brought into position for securement on the rack 11. At this time the sway braces will be held in their guides by contact with the tank as there is no other provision for so retaining them when the tank is not so positioned. With the tank properly secured to the rack, each brace may then be locked against vertically upward movement by upwardly threading the adjusting sleeve 30 against the end of the guide 34 until the yoke means is tight against the tank. By so adjusting the sleeve a substantially solid assembly can be achieved in which the resilient elements 42 do not act against upward loads. This is so since the reaction of the sleeves 30 against the guides 34 is taken directly in the rack catch means 15.

However, it is advantageous to have the springs arranged as shown so that if the sleeves 30 are not desired to be tightly adjusted or are improperly adjusted the former will always act to force the sway braces against the tank or other article. But the preferred assembly adjustment for a rigid article such as the tank 20 is to thread each sleeve 30 upwardly and tight against its respective guide. If the article being carried is not rigidly constructed then the springs will act to maintain the same against movement.

Once the sway braces have been adjusted as above noted a fairing structure 50 may be positioned between the tank and the wing as shown in Figures 1 and 2. This fairing comprises two parts or halves as at 51 and 52 (see Figures 4 and 5) which are suitably lap-joined at the leading edge by a series of screws 53 and sheet metal nuts 54 of a well known type. At the trailing edge, these fairing halves are detachably connected by the use of a joining strip 55 tack welded to the part 52 and formed to lap under the trailing edge of the part 51 for securement by a series of screws 56 and sheet metal nuts 57 as before noted. In assembling the fairing the trailing edge is opened up sufficiently to be slipped over the sway braces and rack in a front to rear direction, it being noted that the leading edge joint possesses sufficient flexibility to allow for such temporary spreading of the fairing parts. Moreover, the fairing is so constructed that, for any particular article, there will be a slight force necessary to secure the trailing edge joint, thereby forcing the margins against the article and against the under surface of the ring. After positioning the fairing, the same may be secured by direct attachment to the extremities of the yoke elements 27 as clearly shown by the screws 58 in Figure 2. Screw seats or surface depressions 59 are made in the fairing at each of these points. It is now clear that upon release of the tank 20 from rack 11 the spring loaded sway braces will be driven outwardly of their guides and in so doing will take the fairing structure along thus leaving only the rack exposed to the air stream. At the same time the skin apertures 49 will be substantially filled by the sliding piston means 44.

Certain modifications and rearrangements may be made in the present disclosure without in any way departing from the principal aims and objects above set forth or from the spirit and intended scope of the claims hereafter appearing.

What is claimed is:

1. A sway brace assembly for use in conjunction with a jettisonable article carried on an airfoil structure, said sway brace assembly comprising a jettisonable member having a central stem, guide means in the airfoil structure opening outwardly thereof to receive the stem of said sway brace when the latter is positioned to contact the article and prevent its sway, a piston member movably mounted in said guide means to contact said stem, and means in said guide means to urge said piston member against said stem and hence urge said sway brace outwardly into contact with the article and, upon jettisoning of the latter, to urge said piston member outwardly to close said guide means and jettison said first mentioned member.

2. A sway brace assembly for use in conjunction with a jettisonable article carried on an aircraft, said sway brace assembly comprising a jettisonable member having a central stem, guide means in the aircraft opening outwardly thereof to receive the stem of said sway brace when the latter is positioned to contact the article and prevent its sway, a piston member movably mounted in said guide means to contact said stem and a resilient element in said guide means to urge said piston member against said stem and hence urge the latter outwardly into contact with the article and, upon jettisoning of the latter, to urge said piston member outwardly to close said guide means and jettison said first mentioned member.

3. A sway brace assembly for use in conjunction with a jettisonable article carried on an aircraft, said sway brace assembly comprising a jettisonable member having a central stem, guide means in the aircraft opening outwardly thereof to receive the stem of said sway brace when the latter is positioned to contact the article and prevent its sway, a piston member movably mounted in said guide means to contact said stem, means in said guide means to urge said piston member against said stem and hence urge the latter outwardly into contact with the article and, upon jettisoning of the latter, to urge said piston member outwardly to close said guide means and jettison said first mentioned member, and a fairing structure carried by said jettisonable member to enclose the latter and fair the article into the aircraft.

4. In an aircraft structure, an article carrying rack secured to the structure and releasably carrying the article externally of said structure, an article sway brace movably mounted upon guide means within said structure and projecting outwardly from said structure into position for contact with the article carried by said rack for supporting the article against movement relative to the rack, and resilient means within the structure acting on said sway brace to urge the same outwardly into such contact with the article and to jettison said sway brace from said structure simultaneously upon release of the article from said rack.

5. In an aircraft structure, an article carrying rack secured to the structure and arranged for releasably engaging the article for supporting the latter externally of said structure, an article sway brace constructed for movement into and out of the structure, said sway brace projecting from said structure into contact with the article, a guide within the structure supporting said sway brace for such movement, resilient means acting between said guide and said sway brace for urging the latter outwardly of the structure against the article for sway bracing the article and urging outward displacement of the article from said rack, said resilient means acting to jettison said sway brace from said structure simultaneously with release of the article from said rack, and means on said sway brace for adjustably limiting its inward movement whereby the same may be adjusted to maintain the article against unintended movement.

PAUL M. BIRK.
FREDERICK I. STEELE.

REFERENCES CITED

The following references are of record in the file of this patent:

UNITED STATES PATENTS

| Number | Name | Date |
| --- | --- | --- |
| 2,369,638 | Baker et al. | Feb. 20, 1945 |

FOREIGN PATENTS

| Number | Country | Date |
| --- | --- | --- |
| 67,512 | Sweden | Aug. 6, 1926 |

Certificate of Correction

Patent No. 2,461,406.                                                                                                February 8, 1949.

PAUL M. BIRK ET AL.

It is hereby certified that errors appear in the printed specification of the above numbered patent requiring correction as follows:

Column 4, line 27, for the word "ring" read *wing* ; line 46, after "What is claimed is:" insert the following claims:

> 1. *In an aircraft having an airfoil structure, an article carrying rack secured on the airfoil structure for releasably mounting the article thereto, guide means in the airfoil structure and opening outwardly thereof adjacent said rack, an article sway brace carried in said guide means to project into contact with the article mounted on said rack, and means movably carried in said guide means for urging said sway brace against the article, said last means being effective to rid the airfoil structure of said sway brace simultaneously with the release of the article from said rack.*
>
> 2. *In an aircraft having an airfoil structure, an article carrying rack secured on the airfoil structure for releasably mounting the article thereto, guide means in the airfoil structure and opening outwardly thereof adjacent said rack, an article sway brace carried in said guide means to project into contact with the article mounted on said rack and means movably carried in said guide means for urging said sway brace against the article, said last means being effective to rid the airfoil structure or said sway brace simultaneously with the release of the article from said rack and to effect a substantial closure of the opening in said guide means.*
>
> 3. *In an aircraft having an airfoil structure, an article carrying rack secured to the airfoil structure and releasably engaging the article, an article sway brace carried by the airfoil structure in position to contact the article carried by said rack, means in the airfoil structure acting on said sway brace to urge the same against the article, said means being arranged to rid the airfoil structure of said sway brace simultaneously upon release of the article from said rack, and a fairing structure carried by said sway brace for enclosing the latter and said rack.* for the claims now appearing in the patent as "1", "2", "3", "4", and "5", read *4, 5, 6, 7,* and *8* respectively; in the heading to the printed specification, line 7, for "5 Claims" read *8 Claims* ;

and that the said Letters Patent should be read with these corrections therein that the same may conform to the record of the case in the Patent Office.

Signed and sealed this 28th day of June, A. D. 1949.

[SEAL]

THOMAS F. MURPHY,
*Assistant Commissioner of Patents.*